April 5, 1927.　　　　　　　　　　　　　　　　　　　　1,623,505
J. TESSIER
MOTION PICTURE APPARATUS
Filed April 23, 1924　　　2 Sheets-Sheet 1
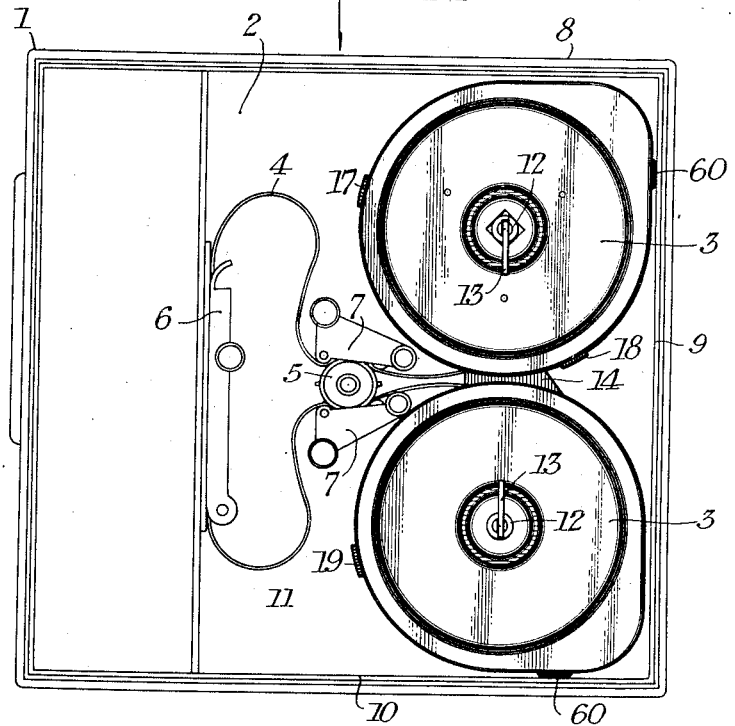
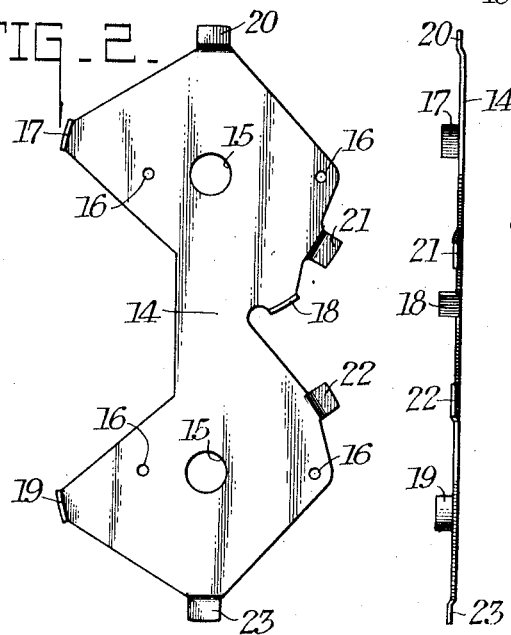
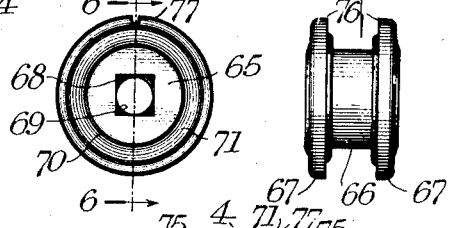
INVENTOR,
Julien Tessier,
BY
ATTORNEY April 5, 1927.　　　　　　　　　　　　　　　　　　1,623,505
J. TESSIER
MOTION PICTURE APPARATUS
Filed April 23, 1924　　2 Sheets-Sheet 2
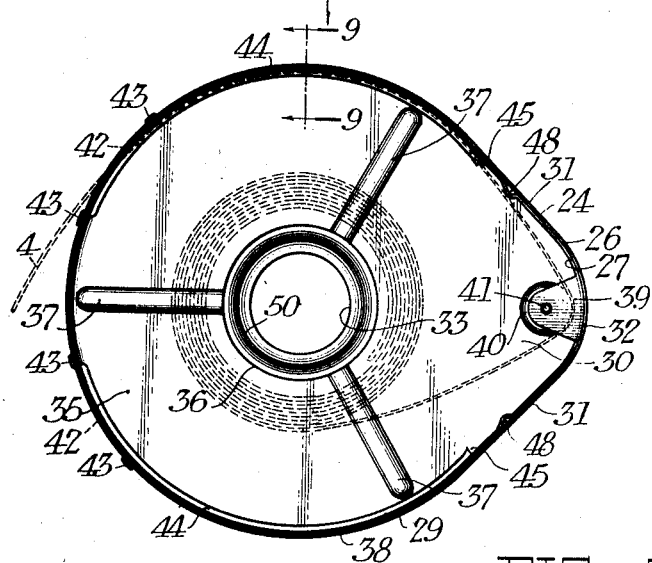
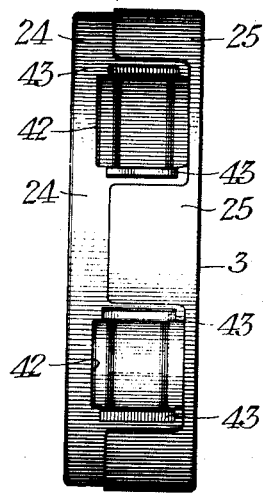
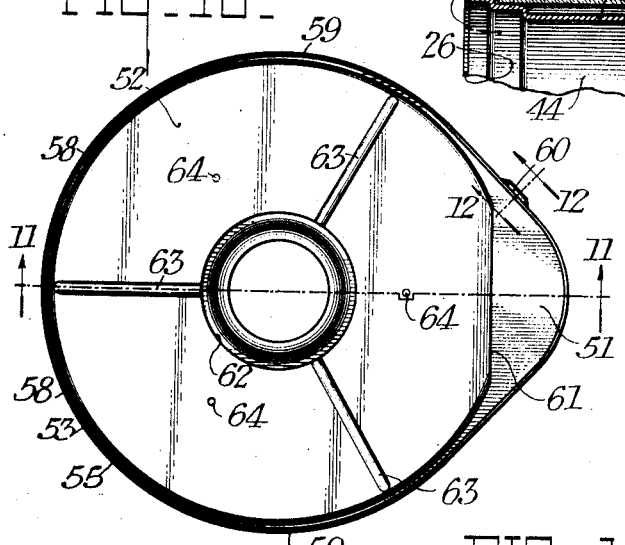
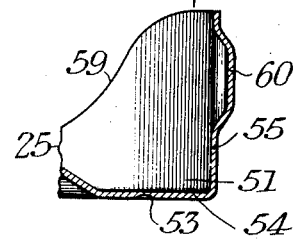
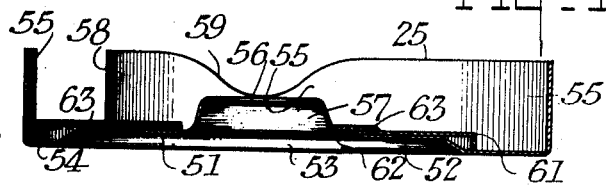
INVENTOR,
Julien Tessier,
BY R. L. Stutchfield
N. M. Perrins
ATTORNEY Patented Apr. 5, 1927.

1,623,505

UNITED STATES PATENT OFFICE.

JULIEN TESSIER, OF ROCHESTER, NEW YORK, ASSIGNOR TO EASTMAN KODAK COMPANY, OF ROCHESTER, NEW YORK, A CORPORATION OF NEW YORK.

MOTION-PICTURE APPARATUS.

Application filed April 23, 1924. Serial No. 708,545.

This invention relates to motion picture cameras and more particularly to the adaptation of such cameras for use with special film magazines which cooperate therewith.

The objects of my invention are to provide a camera and magazine therefor permitting of daylight loading of the camera; to provide a magazine that will fit into the camera in two different positions for supply and take-up purposes; to provide a magazine that will have two light sealed openings so located that when the magazine is in either position in the camera one opening will be available for feed or take-up purposes; and to provide a structure that will be easy to operate, and inexpensive to manufacture.

These objects are attained by and my invention resides in the structures and all the details thereof which will now be fully described, reference being made to the accompanying drawings in which the same reference characters are used throughout, to designate the same parts and in which;

Fig. 1 is a side view of an open camera showing my improved magazines therein and showing in outline only these camera elements which cooperate therewith.

Fig. 2 is a plan of a plate in the camera that adapts it for use with my improved magazines.

Fig. 3 is an edge view of the adapter plate.

Fig. 4 is an end view of a rotatable core used in my magazine.

Fig. 5 is an edge view thereof.

Fig. 6 is a section on line 6—6 of Fig. 4.

Fig. 7 is a plan of one member of my magazine.

Fig. 8 is an end view of my magazine.

Fig. 9 is a section on line 9—9 of Fig. 7.

Fig. 10 is a plan of the other member of my magazine.

Fig. 11 is a section on line 11—11 of Fig. 10.

Fig. 12 is a section on line 12—12 of Fig. 10.

The camera 1 is of a compact box form of the general type described in my pending application Serial No. 378,616 filed May 3, 1920, which matured into Patent 1,572,252 granted Feb. 9, 1926, and comprises a casing 1 having a film compartment 2 in which are the film magazines 3 from one of which the film 4 passes over a sprocket wheel 5 to a suitable gate 6 and then back over the sprocket to the second magazine. It is held in place on the sprocket by presser devices 7. The compartment has an upper wall 8, a rear wall 9, lower wall 10 and bottom 11. Shafts 12 with latches 13 are provided for the magazines.

Secured on the bottom of the compartment is an adapter plate 14 having apertures 15 fitting over shafts 12 and small apertures 16 for securing means such as screws (not shown). At appropriate points on this plate are lugs 17, 18 and 19 bent up perpendicularly to the plate, and other supporting lugs 20, 21, 22 and 23 bent slightly out of the plane of the plate and parallel thereto.

A magazine 3 comprises two similarly shaped telescoping members 24 and 25. The inner member 24 is formed from two sheet metal elements 26 and 27. The element 26 has a bottom 34 with an opening 33 surrounded by an inwardly extending rim 50, an outer edge bead 28 and a peripheral flange 29. The periphery of this element is arcuate, concentric with the opening 33, except for an extension 30, the sides 31 of which are straight, tangential to the arc, perpendicular to each other and joined by the rounded corner 32. The element 27 fits within element 26 and has a bottom 35 with an aperture 36 larger than aperture 33 and coaxial therewith, and ribs 37 radial to this aperture. It has a peripheral flange 38 fitting closely within flange 29. At the end of the extension, the top of this flange is continued and bent over to form a bracket 39, between which and bottom 35 is mounted a roller 40 on an axis 41. Elements 26 and 27 are held in place functionally so that 27 can be removed and the tunnel cleaned.

As is obvious, the magazine is oval or pear shaped. In the flange 29, symmetrically placed at the broad end, are apertures 42. Part of the metal at the edges of the apertures is turned back to form strengthening beads 43. The flanges 38 from points 45 opposite the straight portions 31 to points beyond the aperture 42 are bent to form tunnels 44, these being open ended. They are struck up further at their median portions 46 than at their borders 47, as shown in Fig. 9, so that the film 4 contacts them only at its edges. Near the points 45 there are formed protuberances 48 in the flanges 38 to assist in directing the film between the roller 40 and a point 45. It is obvious that film 4 from a roll within the magazine may pass over the roller 40 in either direction to the corresponding tunnel 44 and aperture 42 to the outside of the casing, and that the tunnel forms a light trap.

The outer or cover member 25 of the magazine fits closely over the inner member 24 and, like it, comprises outer and inner elements 51 and 52. The outer element 51 has an oval bottom 53 with a peripheral bead 54 and flanges 55 and an aperture 56 surrounded by the inwardly extending rim 57. From flange 55 are cut apertures 58 which register with apertures 42 when the magazine is closed and cut-out portion 59 to facilitate removal of the cover member 25. There is formed on flange 55 a struck out protuberance 60, the function of which will be described later.

The inner element 52 has no flange and consists merely of a plate which is circular except for a straight edge 61 opposite the extended part of the magazine, thus affording space for the positioning of bracket 39 when the magazine is closed. The element 52 has an aperture 62 surrounding rim 57 and radial ribs 63. It is attached to the element 51 by any desired means, as by spot welding at 64.

There is used in the magazine a core 65 shown in Figs. 4 to 6. This has a cylindrical sheet metal hub element 66 on the ends of which are slipped two flange elements 67 which are similar, except that one has a square central hole 68 and the other a round hole 69. Each has a flange portion 70 tightly surrounding hub 65 and is then bent out at 71 and back at 72 to form an annular channel 73. It is then again bent out at 74 and in to form flanges 75. The edges 76 of the flange elements 67 are spaced apart so that the parts 75 form the supports for the edges only of the film. There are formed slots 77 in the flanges 75. The end of the film 4 is slipped into the slots 77, so that it rests in the channel 78 formed under flange 75 and is then bent back as the film is wound on the core, being securely held thereby.

The operation and use of the apparatus will now be described. It is intended that the magazine will be loaded at the factory, the film 4 being wound on the core 65, which is enclosed within the magazine. The rims 50 and 56 will enter the channels 72 of the core and constitute light traps. The outer end of the film will extend around roller 40 through a tunnel 44 and out through an opening 29. The parts will be so assembled at the factory that when lug 60 is in the position shown in Fig. 1, the square hole 68 of the core will face out. The magazine is positioned in the camera, its bottom resting on the lugs 20 and 21 and being firmly clasped and positioned at its edges by lugs 17 and 18. The lug 60 will rest against wall 9. The magazine is purposely so dimensioned that there will be a slight space below wall 8, making insertion easier. Since the film will be so wound that it will unroll in a clockwise direction, the magazine will be firmly positioned.

The film is drawn out and threaded past the sprocket and gate. Another empty magazine is provided and opened and the member 24 thereof positioned, its bottom resting on lugs 22 and 23 and its edges being engaged by lug 19. The core is positioned with the square hole inside to engage a correspondingly shaped shaft, whereby it is driven. The end of the film is passed through the hole 29 which will be situated nearer the sprocket, tunnel 44, around roller 40 and secured to the core. The cover member 25 of the magazine is slipped over member 24 with its lug 60 engaging the lower wall 10.

An easier method of loading is to secure the end of the film in the second magazine before the latter is positioned in take-up position and, after positioning both magazines, form a slack loop which is positioned about the sprocket and gate in the manner described in my above-mentioned application.

The ribs 37 and 63 hold the edges of the film roll in alignment with very little friction, so that it turns readily. When the magazine is in the upper or supply position, the film will be fed out of one tunnel, and when it is in the lower or take-up position, it will be fed out through the other tunnel, passing around the roller in the opposite direction. The film magazine in each position has the same side outermost, but the position of its extension is different, bringing the proper aperture adjacent the sprocket wheel of the camera.

It is obvious that numerous embodiments of my invention are possible and I contemplate all such modifications and equivalents as fall within the scope of the appended claims.

Having thus described my invention what I claim as new, and desire to obtain by Letters Patent is:

1. A film magazine comprising a casing adapted to contain a roll of film and having a roller over which film may be led in either of two directions, and light trapped means on each side of said roller for guiding film between said roller and the exterior of the casing in either of two directions.

2. A film magazine comprising a casing adapted to contain a roll of film and having an extension, a roller in said extension, and light trapped means for guiding film between said roller and the exterior of the casing in either of two directions.

3. A film magazine comprising a casing, adapted to contain a roll of film, and having an extension with sides at an angle one to the other, a roller in said extension, and light trapped tunnels, one arranged along each side, and leading from the roller to openings in the casing.

4. A film magazine comprising a casing with a peripheral wall with openings therein and opposed side walls, a film reel journaled in said casing, a roller journaled in said casing, and light trapping tunnels leading from said roller to the openings in the peripheral wall.

5. A film magazine comprising a casing with a peripheral wall and opposed side walls, a roller journaled in said casing near the peripheral wall, and light trapping tunnels arranged along the peripheral wall symmetrically of the roller and leading therefrom to openings in the casing.

6. A film magazine comprising a casing with a peripheral wall and opposed side walls, a film reel journaled in the central portion of the casing, a roller journaled in the casing near the peripheral wall, and light trapping tunnels arranged along the peripheral wall on each side of the roller and leading therefrom to openings in the casing, whereby film may be threaded from said reel to either side of said roller and then to a tunnel and out of the casing.

7. A film magazine comprising correspondingly shaped telescoping members, each having a bottom and a peripheral flange with openings therein, and having registering openings in said bottoms, a reel adapted for use in said magazine, the reel and the bottoms of the members having cooperating means for journaling the reel coaxially with the openings, the reel having means for engagement with a suitable driving means through one of said openings, the magazine having an extension with straight side walls, a pulley in said extension, and light trapping tunnels arranged along said straight walls symmetrically to said pulley and leading therefrom to the openings in the flanges.

8. In combination with a motion picture camera comprising a casing with upper and lower rear corners, film feeding means, and means near said corners for supporting film magazines, film magazines having symmetrical extensions and each having symmetrically arranged film passages, whereby the magazines may be positioned with the extension in either of the two corners and in either position a film passage will be adjacent the film feeding means.

9. In combination with a motion picture camera having means for positioning a film magazine in supply position and means for positioning another similar film magazine, in take-up position, and having film feeding means for withdrawing film from a magazine in the first position and feeding it to a magazine in the second position, film magazines adapted to fit such positioning means and having a plurality of light trapped film passages so positioned that one of them will be in operative position with respect to the film feeding means in each position of the magazine, the film magazine being so shaped that it can be positioned only in proper position in each position.

10. A film magazine comprising a casing with a peripheral wall with openings therein and opposed side walls, a film reel journaled in said casing, a roller journaled in said casing, and light trapping tunnels leading from said roller to the openings in the peripheral wall, the walls of the tunnels providing edge supports only for one surface of a film passed therethrough.

11. A film magazine comprising an oval casing, and adapted to support a film reel in the larger end thereof, a roll mounted in the smaller end thereof, and tunnels leading from points on each side of the roll to points near the other end of the casing, there being openings from the ends of the tunnels to the exterior of the casing.

12. A film magazine for use in a motion picture camera and of the type comprising extended, parallel upper and lower walls and a peripheral wall connecting the edges of the upper and lower walls constituting a closed hollow casing, characterized by the formation in the peripheral wall of two curved tunnels opening at separate symmetrically disposed points into said chamber, and terminating at separate symmetrically disposed openings in the exterior of the peripheral wall.

Signed at Rochester, New York, this 18th day of April, 1924.

JULIEN TESSIER.